United States Patent
Khorashadi et al.

(10) Patent No.: US 9,332,398 B2
(45) Date of Patent: May 3, 2016

(54) PROVISION OF POSITIONING DATA BASED ON DEVICE CAPABILITY

(71) Applicant: QUALCOMM Incorporated, San Diego, CA (US)

(72) Inventors: Behrooz Khorashadi, Mountain View, CA (US); Ferit Ozan Akgul, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 13/757,670

(22) Filed: Feb. 1, 2013

(65) Prior Publication Data

US 2014/0155090 A1  Jun. 5, 2014

Related U.S. Application Data

(60) Provisional application No. 61/732,061, filed on Nov. 30, 2012.

(51) Int. Cl.
| | |
|---|---|
| *H04W 4/04* | (2009.01) |
| *H04W 4/18* | (2009.01) |
| *H04W 4/20* | (2009.01) |
| *H04W 4/02* | (2009.01) |
| *H04W 24/00* | (2009.01) |
| *H04W 8/22* | (2009.01) |
| *H04W 4/12* | (2009.01) |

(52) U.S. Cl.
CPC .............. *H04W 4/04* (2013.01); *H04W 4/043* (2013.01); *H04W 4/18* (2013.01); *H04W 4/20* (2013.01); *H04W 4/02* (2013.01); *H04W 4/12* (2013.01); *H04W 8/22* (2013.01); *H04W 24/00* (2013.01)

(58) Field of Classification Search
CPC ....... H04W 64/00; H04W 4/02; H04W 4/023; H04W 8/04; H04W 8/06; H04W 8/16; H04W 64/003; H04W 8/24; H04W 88/02; H04W 36/32; H04W 40/02; H04W 4/206; H04W 4/22; H04W 4/028; H04W 4/04; G01S 5/0242; G01S 5/0284; G01S 5/14; G01C 21/20; G01C 21/26; G01C 21/36; H04L 67/18; H04L 67/303; H04L 67/16
See application file for complete search history.

(56) References Cited

U.S. PATENT DOCUMENTS

| | | | |
|---|---|---|---|
| 7,729,706 B2 | 6/2010 | Kim et al. | |
| 8,738,041 B2* | 5/2014 | Siomina et al. | ............ 455/456.6 |
| 2007/0049295 A1 | 3/2007 | Soliman et al. | |
| 2007/0182547 A1* | 8/2007 | Wachter et al. | .......... 340/539.13 |
| 2009/0111487 A1 | 4/2009 | Scheibe | |

(Continued)

OTHER PUBLICATIONS

International Search Report and Written Opinion—PCT/US2013/070084—ISA/EPO—Apr. 7, 2014.

*Primary Examiner* — Nizar Sivji
(74) *Attorney, Agent, or Firm* — Berkeley Law & Technology Group, LLP (57) ABSTRACT

Disclosed are processes, systems and apparatuses for providing positioning data, such as assistance data, to a mobile device for use in performing positioning or navigation operations. In particular implementations, the positioning data is based, at least in part, on particular capabilities of the mobile device, for example a processing platform of the mobile device. In other implementations, positioning data provided to a mobile device may be tailored according to a cost function.

44 Claims, 6 Drawing Sheets

(56) References Cited

U.S. PATENT DOCUMENTS

| | | |
|---|---|---|
| 2010/0291947 A1* | 11/2010 | Annamalai ............... 455/456.1 |
| 2010/0323723 A1 | 12/2010 | Gerstenberger et al. |
| 2011/0081918 A1 | 4/2011 | Burdo et al. |
| 2011/0190004 A1 | 8/2011 | Tenny et al. |
| 2011/0212733 A1* | 9/2011 | Edge et al. ............... 455/456.1 |
| 2012/0028654 A1 | 2/2012 | Gupta et al. |
| 2012/0044265 A1 | 2/2012 | Khorashadi et al. |
| 2012/0329479 A1* | 12/2012 | Wirola et al. ............. 455/456.1 |

* cited by examiner

PROVISION OF POSITIONING DATA BASED ON DEVICE CAPABILITY

CROSS REFERENCE TO RELATED APPLICATIONS

This application claims priority under 35 U.S.C. §119(e) from U.S. Provisional Patent Application No. 61/732,061 entitled Provision of Positioning Data Based on Device Capability, filed Nov. 30, 2012, the entire contents of which are incorporated herein by reference.

FIELD

Embodiments disclosed herein are related to techniques for computing an estimated location of a mobile device.

BACKGROUND

Global Positioning System (GPS) and other like satellite positioning systems have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, signal strength, round trip delay, just to name a few examples.

In some implementations, an indoor navigation system may provide a digital electronic map to mobile stations as they enter a particular indoor area. Such a map may show indoor features such as doors, hallways, entry ways, walls, etc., points of interest such as bathrooms, pay phones, room names, stores, etc. Such a digital electronic map may be stored at a server to be accessible by a mobile device through selection of a URL, for example. By obtaining and displaying such a map, a mobile device may overlay a current location of the mobile device (and user) over the displayed map to provide the user with additional context.

In some implementations, in addition to a digital electronic map, an indoor navigation system may selectively provide positioning assistance data to mobile stations to facilitate and/or enable location based services (LBS). Such positioning assistance data may include, for example, information to facilitate measurements of ranges to wireless access points at known fixed locations. For example, "heatmap" or "radio map" data indicating expected RSSI and/or round-trip delay times associated with access points may enable a mobile station to associate signal measurements with locations in an indoor area. Here, grid points may be laid over locations in an indoor interval at uniform spacing (e.g., two-feet separation of neighboring grid points). Heatmap metadata may be made available from a local server for each grid point covering an indoor area. Other positioning assistance data may include locations of transmitters, routeability graphs, probability heatmaps, digital maps for display, just to name a few examples.

BRIEF DESCRIPTION OF DRAWINGS

Non-limiting and non-exhaustive aspects are described with reference to the following figures, wherein like reference numerals refer to like parts throughout the various figures unless otherwise specified.

SUMMARY

Particular implementations are directed to a method comprising, at a mobile device: transmitting one or more request messages for positioning data, said one or more request messages indicating a capability of said mobile device; and in response to at least one of said one or more request messages, receiving one or more response messages comprising positioning data based on the indicated capability.

Other implementations are directed to a mobile device comprising: a transceiver to facilitate communication through a wireless network; and one or more processors to: initiate transmission of one or more request messages through said transceiver for positioning data, said request message indicating a capability of said mobile device; and obtain positioning data in one or more response messages received at said transceiver in response to said one or more request messages, said positioning data based on the indicated capability.

Other implementations are directed to a non-transitory storage medium comprising machine-readable instructions stored thereon which are executable by a special-purpose computing apparatus to: initiate transmission of one or more request messages for positioning data, said request message indicating a capability of said mobile device; and obtain positioning data in one or more response messages received in response to said one or more request messages, said positioning data based on the indicated capability.

Other implementations are directed to an apparatus comprising: means for transmitting one or more request messages for positioning data, said one or more request messages indicating a capability of a mobile device; and means for receiving one or more response messages transmitted in response to at least one of said one or more request messages comprising positioning data based on the indicated capability.

Other implementations are directed to a method comprising, at a server: receiving one or more request messages from a mobile device requesting positioning data; identifying a capability of said mobile device based, at least in part, on at least one of said request messages; and transmitting one or more response messages to the mobile device including positioning data based, at least in part, on the identified capability.

Other implementations are directed to a server comprising: a transceiver to facilitate communication over a network; and one or more processors to: obtain one or more request messages from a mobile device for positioning data received at said transceiver; identify a capability of said mobile device based, at least in part, on at least one of said request messages; and initiate transmission of one or more response messages through said transceiver to the mobile device including positioning data based, at least in part, on the identified capability.

Other implementations are directed a non-transitory storage medium comprising machine-readable instructions stored thereon which are executable by a special purpose computing apparatus to obtain one or more request messages from a mobile device requesting positioning data; identify a capability of said mobile device based, at least in part, on at least one of said request messages; and initiate transmission of one or more response messages to the mobile device including positioning data based, at least in part, on the identified capability.

Other implementations are directed to an apparatus comprising: means for receiving one or more request messages from a mobile device requesting positioning data; means for identifying a capability of said mobile device based, at least in part, on at least one of said request messages; and means for transmitting one or more response messages to the mobile device including positioning data based, at least in part, on the identified capability.

It should be understood, however, that the aforementioned implementations and embodiments are merely example implementations and embodiments, and do limit claimed subject matter.

DETAILED DESCRIPTION

As discussed above, positioning assistance data may be provided to mobile devices from a local server through wireless communication links. The mobile device may locally store received positioning assistance information in a local memory. In larger indoor areas with multiple access points and feasible routes, positioning assistance data received from a local server may be quite voluminous so as to tax available bandwidth in wireless communication links and data storage capacity on mobile devices. Those of skill in the art will appreciate that a remote server may also store and/or provide such positioning assistance data to a mobile device. Further, positioning data other than positioning assistance data may be provided in some embodiments.

In a particular implementation, it is recognized that different mobile devices receiving and utilizing positioning assistance data may have processing platforms with different processing capabilities. For example, inexpensive or low end mobile devices may have a processing platform with limited capabilities that are not capable of drawing inferences (e.g., deriving routeability graphs, radio heatmaps, etc.) from raw data (e.g., raw maps identifying walls and/or locations of wireless transmitters). Conversely, an advanced mobile device with a processing platform furnishing extensive processing resources may be capable of processing larger or smaller amounts of raw data to draw inferences to assist in positioning operations. Additionally, some mobile devices may have a capability to store large amounts of positioning assistance data in a retrievable memory device without substantially affecting processing performance of the mobile device. Accordingly, as transmitting voluminous raw data to an advanced mobile device with a processing platform capable of processing the raw data for drawing inferences to leverage advanced processing capabilities may be beneficial in some scenarios, transmitting such raw data to a device with limited processing capability may not be useful and may be wasteful of memory and data transmission resources.

According to an embodiment, a mobile device requesting positioning assistance data may be classified as one of a plurality of different processing platform classifications based, at least in part, on processing capabilities. For example, a processing platform may be classified based, at least in part, on a type or number of processors available.

Individual processors may be classified based, at least in part, on whether the processor is a particular digital signal processor, general purpose or application processor, generation or version of processor, processor speed, instruction sets (e.g., x86, ARM, MIPS, etc.), just to provide a few examples. A processing platform may be further classified based, at least in part, on an amount or type of memory available (e.g., NAND flash, NOR flash, DRAM, PCM, etc.). Also, recognizing that computations to infer or derive positioning assistance data may consume substantial battery resources, a processing platform may be classified, at least in part, based on an availability of battery resources to perform these computations while preserving battery resources for critical applications (e.g., voice or data service, etc.). It should be understood, however, that these are merely examples of attributes that may be considered in classifying a processing platform of a mobile device and claimed subject matter is not limited in these respects. A processing platform classification, battery level, and/or available memory are merely attributes that may be evaluated for determining a capability of a mobile device. It should be understood, however that a capability of a mobile device may be determined or evaluated based on other attributes or distinctions.

Messages requesting positioning assistance data transmitted from a mobile device to a server may, among other things, provide some indication of a processing platform classification of the requesting mobile device. For example, these requesting messages may include bits or indications of a number and type of available processors type, number of processors, and available quantity and type of memory. These requesting messages may also indicate an availability of battery resources to compute or infer positioning assistance data. It should be understood, however, that these are merely examples of how messages transmitted from a mobile device may provide an indication of a type of processing platform classification of the mobile device, and claimed subject matter is not limited in this respect. Based, at least in part, on messages requesting positioning assistance data received from a mobile device, a server may determine a processing platform classification of the mobile device, and provide positioning assistance data tailored to the determined processing platform classification.

Figure 1:
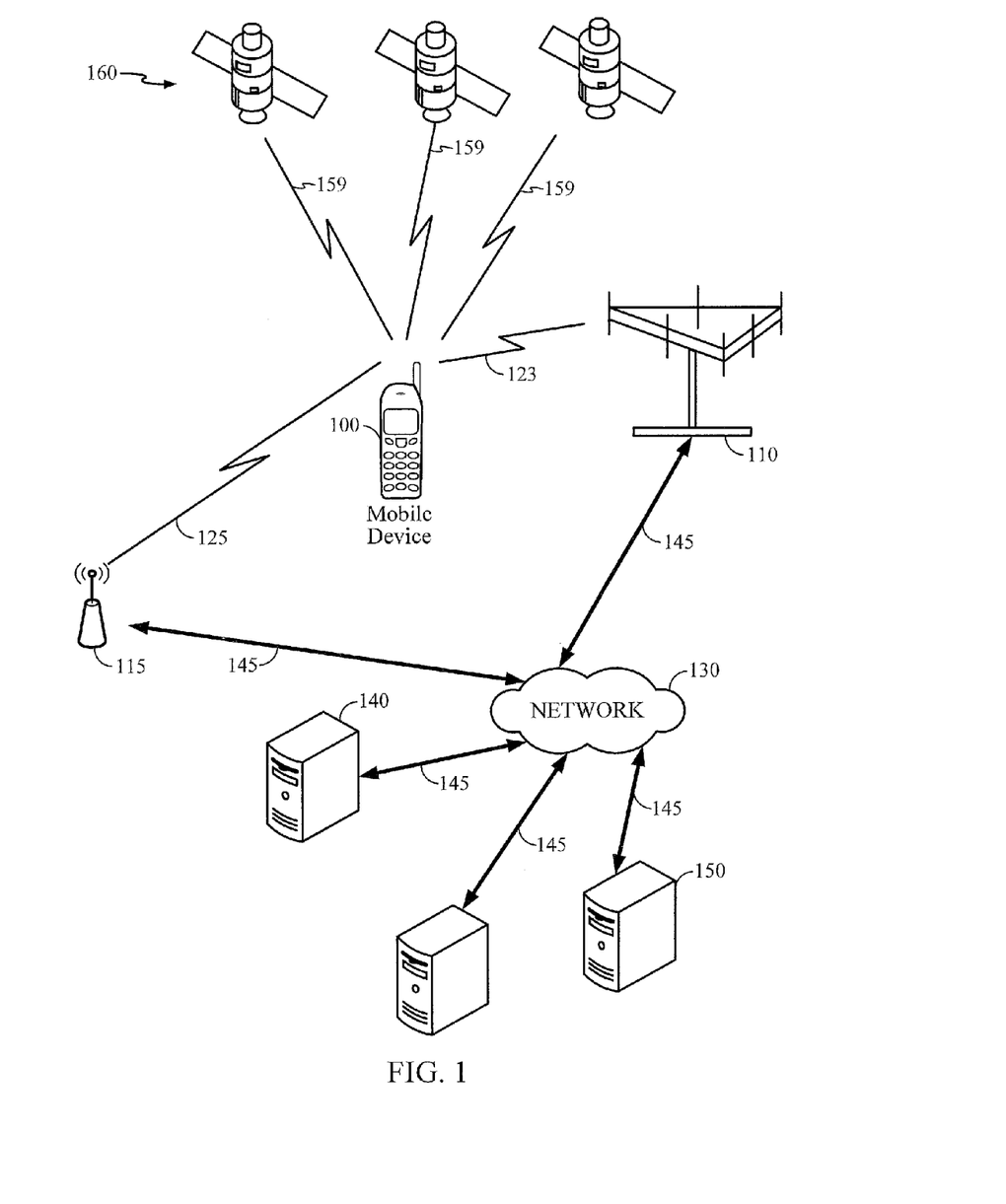
FIG. 1 is a system diagram illustrating certain features of a system containing a mobile device, in accordance with an implementation.

In certain implementations, as shown in FIG. 1, a mobile device 100 may receive or acquire SPS signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In addition, the mobile device 100 may transmit radio signals to, and receive radio signals from, a wireless communication network. In one example, mobile device may communicate with a cellular communication network by transmitting wireless signals to, or receiving wireless signals from, a base station transceiver 110 over a wireless communication link 123. Similarly, mobile device 100 may transmit wireless signals to, or receiving wireless signals from a local transceiver 115 over a wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 150. In another implementation, network 130 may comprise cellular communication network infrastructure such as, for example, a base station controller or master switching center to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

Here In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio "heatmap" indicating expected RSSI and/or RTT signatures at particular locations in an indoor area.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

In one particular implementation, a request for indoor navigation assistance data from mobile device 100 may specify a location context identifier (LCI). Such an LCI may be associated with a locally defined area such as, for example, a particular floor of a building or other indoor area which is not mapped according to a global coordinate system. In one example server architecture, upon entry of an area, mobile device 100 may request a first server, such as server 140, to provide one or more LCIs covering the area or adjacent areas. Here, the request from the mobile device 100 may include a rough location of mobile device 100 such that the requested server may associate the rough location with areas covered by known LCIs, and then transmit those LCIs to mobile device 100. Mobile device 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio heatmaps or routeability graphs).

Figure 2:
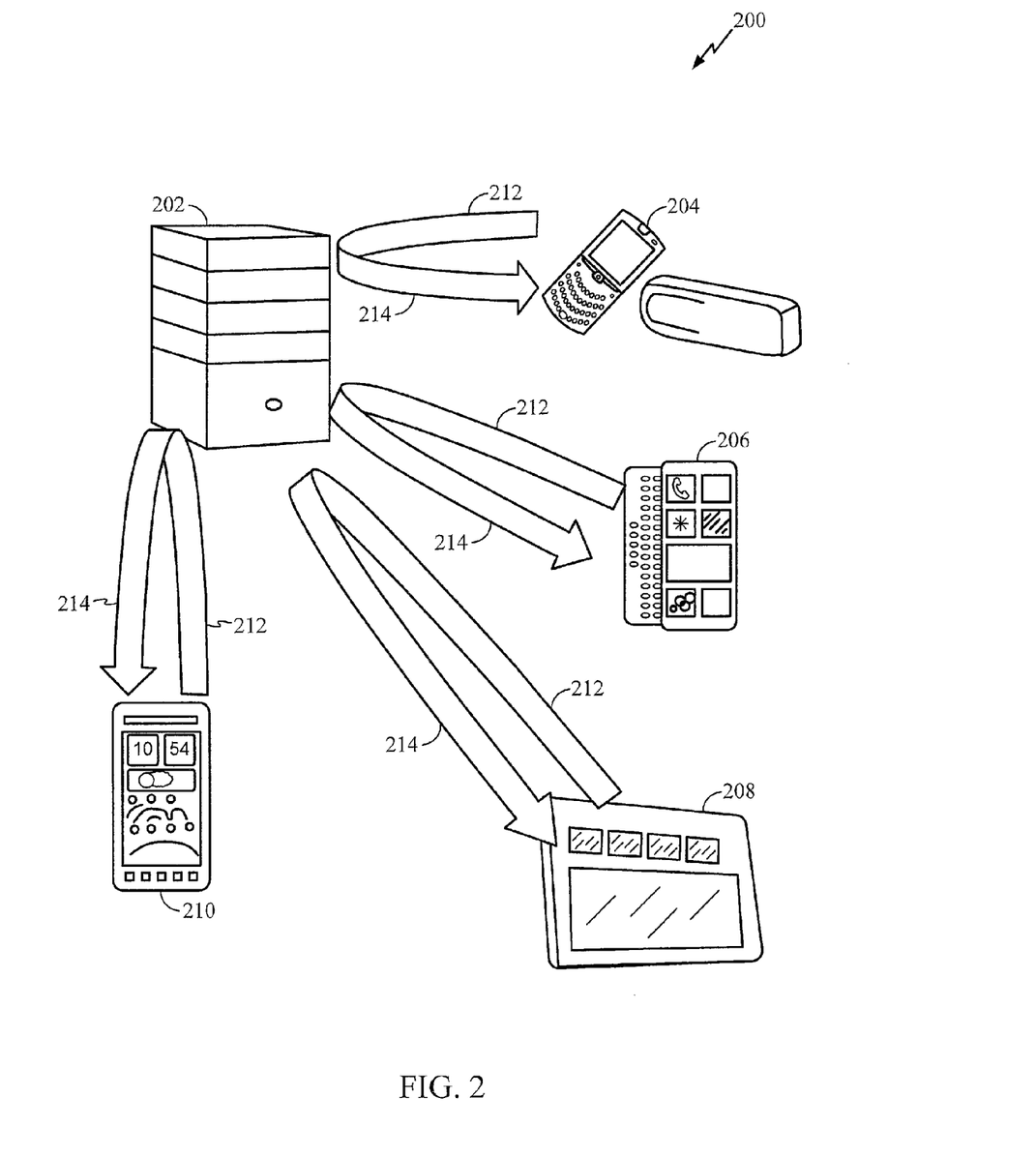
FIG. 2 is a system diagram illustrating messages transmitted between a server and mobile device according to an implementation.

FIG. 2 illustrates a system 200 comprising a server 202 that is capable of providing positioning assistance data to mobile devices 204, 206, 208 and 210. As discussed above, mobile devices 204, 206, 208 and 210 may transmit one or more request messages 212 to server 202 requesting positioning assistance data, and receive one or more response messages 214 comprising positioning assistance data. Like mobile device 100 shown in FIG. 1, mobile devices 204, 206, 208 and 210 may communicate with a server using any combination of wired and wireless links. While server 202 is shown as a single entity, it should be understood that server 202 may represent multiple related entities capable of communicating with mobile devices 204, 206, 208 and 210 to collectively receive one or more messages requesting positioning assistance data and transmitting one or more response messages comprising positioning assistance data tailored according to a processing platform classification as described with particular examples.

As pointed out above, mobile devices 204, 206, 208 and 210 may have different processing platform classifications indicative of different processing capabilities. In a particular implementation, mobile device 204 may comprise low-end processing platform with lower processing capabilities while mobile devices 206, 208 and 210 may have increasingly greater or more powerful processing capabilities. For example, mobile device 204 may comprise a feature phone while mobile devices 206, 208 and 210 may comprise Smartphones with increasing processing capabilities. Similarly, as discussed above, processing capabilities among mobile devices 204, 206, 208 and 210 may be differentiated based, at least in part, on an availability of battery resources for powering devices to perform computations.

In one implementation, request messages 212 from mobile device 204 may indicate mobile device 204 as a mobile device with limited processing capabilities such as, for example, processing capabilities of a feature phone or low-cost tracking device. Here, request messages 212 may comprise one or more identifiers, fields, bits and/or flags indicative of a feature phone with limited processing capabilities, a particular number and/or type of processor, and/or an amount or type of memory. It should be understood, however, that these are merely examples of how a message from a mobile device may be indicative of a processing platform capability, and claimed subject matter is not limited in this respect. Based at least in part on the one or more request messages 212 from mobile device 204, server 202 may determine a classification of a processing platform employed by mobile device 204. Classifying mobile device 204 as a feature phone or a phone with depleted battery capacity with limited processing capabilities, server 202 may determine that mobile device 204 is not capable of inferring any positioning assistance data from raw data, and transmit positioning assistance data that does not require any significant pre-processing or inference. This may include, for example, fully computed radio heatmaps or signatures, probability heatmaps, exclusion/accessor information, line of sight (LOS)/non-line of sight (NLOS), per access point bounding box, routeability graphs, a three dimensional connectivity graph or routeability graph connecting regions or spaces identifiable by different LCIs, just to provide a few examples.

In one implementation, request messages 212 from mobile devices 206, 208 and 210 may indicate these mobile devices as having enhanced processing capabilities capable of inferring at least a portion of positioning assistance data from raw data descriptive of an environment. Classifying mobile device 206, 208 or 210 as having enhanced processing capabilities based on request messages 212 from these devices, server 202 may determine that mobile devices 206, 208 210 may be capable of extracting features from raw data (e.g., raw maps of an indoor area, locations and identities of fixed-location transmitters) and computing or inferring positioning assistance data (e.g., routeability graphs or radio heatmaps) from features extracted from the raw data.

In a particular implementation, a mobile device having enhanced processing capabilities may infer any one of several aspects of positioning assistance data. For example, a mobile device may receive partial assistance data including, for example, identities and locations of fixed-location transmitters, a map in a view format showing a layout of walls, partitions and/or cubicles in an indoor area. Such a raw format may include, for example, a proprietary CAD format, Joint Photographic Experts Group (JPEG) format, Tagged Image File Format (TIFF), or Graphics Interchange Format (GIF), just to name a few examples. If the mobile device has a processing platform with enhanced processing capabilities, the mobile device may, for example, apply an RF signal attenuation model to the identities and locations of fixed-location transmitters, and the map in a view format to compute or derive expected RSSI signatures for discrete locations in the indoor areas part of a derived radio heatmap. Here, in addition to considering signal attenuation from distance travelled, such an attenuation model may also consider attenuation from physical barriers (e.g., walls) between a transmitter location and a receiver location. Additionally, such a mobile having a processing platform with enhanced processing capabilities may have capabilities to extract image features from a map in a view format to generate a digital map in a format and dimensions suitable for presentation on a display device of the mobile device. Also, the mobile device with a processing platform with enhanced processing capabilities may further be capable of generating a routing graph from the extracted image features defining feasible movement of the mobile device in the indoor area (e.g., to define constraints for application of a particle filter or other motion model).

Based, at least in part, on an indication of a processing platform capability of a mobile device in a request message 212 received from the mobile device, server 202 may tailor assistance data to be provided in response to the message. For example, if a request message 212 from mobile device 204 indicates a processing platform capability such as that of a basic feature phone, server 202 may provide positioning assistance data in a response message 214 including a fully realized radio heatmap, displayable digital map and routeability graph. On the other hand, if a request message 212 received from mobile device 210 indicates a processing platform capability that has enhanced processing capabilities, server 202 may provide positioning assistance data in a response message 214 including merely locations and identities of transmitters and a document in a view format showing an indoor area layout. Mobile device 210 with the enhanced processing capabilities may then infer or derive additional positioning assistance data from the document in the view format, and locations and identities of transmitters. In another example, if a request message 212 received from mobile device 206 indicates processing capability greater than that of a feature phone but less fully enhanced processing capabilities, server 202 may provide partially derived assistance data such as, for example, a bitmap specifying a routeability graph and transmitter locations, leaving mobile device to derive or infer remaining positioning assistance data.

Figure 3:
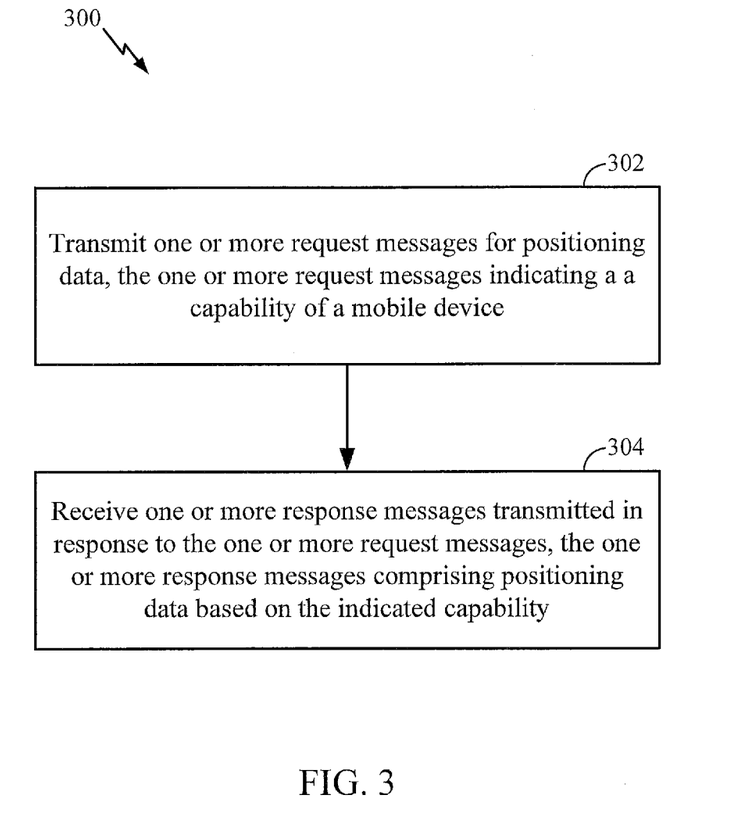
FIG. 3 is a flow diagram illustrating a process for requesting and receiving positioning assistance data according to an implementation.

FIG. 3 is a flow diagram of a process performed at a mobile device in connection with request and receipt of positioning assistance data, according to an embodiment. At block 302, a mobile device may transmit one or more request messages (e.g., request messages 212 in FIG. 2) requesting positioning assistance data to a server (e.g., server 202 in FIG. 3). This one or more request messages may indicate a processing platform classification of the requesting mobile device. The one or more request messages may indicate a processing platform classification using any one of several techniques such as, for example, including a unique device identifier, mobile device make, model or version, a particular type of message, just to provide a few examples of how a specific processing platform classification may be indicated in messages transmitted from a mobile device. In other implementations, device capabilities may be indicated in special messages such as mobile status messages that indicate air interface or available cache size. As discussed above, an indicated processing platform classification may express an ability or capability of inferring positioning assistance data (e.g., inferring radio heatmaps and/or routeability graphs from a CAD drawing and locations and identities of transmitters with enhanced capabilities).

At block 304, a requesting mobile device may receive one or more response messages (e.g., messages 214 from server 202) transmitted in response to the one or more request messages transmitted at block 302. As pointed out above, the one or more response messages may comprise positioning assistance data that is tailored to the processing platform classification of the requesting mobile device as indicated in the one or more request messages transmitted at block 302. If only partial positioning assistance data (e.g., locations/identities of transmitters and a CAD document) is provided, the mobile device may then compute or infer other, useful positioning assistance data (e.g., radio heatmap and routeability graph) as discussed above.

Figure 4:
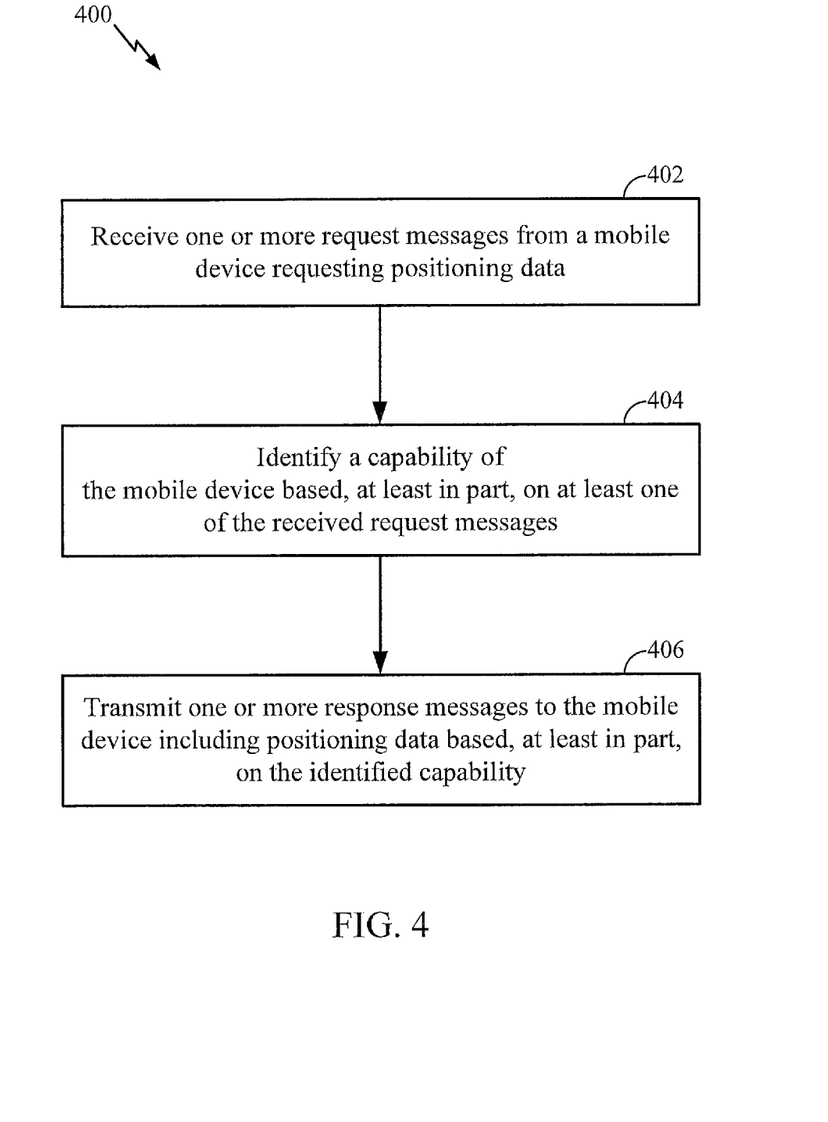
FIG. 4 is a flow diagram illustrating a process to provide positioning assistance data to a mobile device in response to one or more request messages.

FIG. 4 is a flow diagram of a process performed at a server to provide positioning assistance data to a mobile device, according to an embodiment. At block 402, one or more request messages (e.g., messages 212) may be received from a mobile device requesting positioning assistance data. At block 404, a processing platform classification of the requesting mobile device may be determined based, at least in part, on the received request messages. For example, a portion of the one or more request messages may comprise an explicit indication of processing capabilities at the mobile device (e.g., feature phone, enhanced processing capabilities, etc.) as discussed above. Alternatively, the one or more messages may have a unique device identifier which can be matched to a processing platform classification via a look up table. In another example, the one or more messages may have an explicit indication of a processor make, type or version, available size and type of memory, or other processing resources available at the requesting mobile device to infer positioning assistance data. In another example, the one or more messages may have an indication of a battery level. At block 406, a server may transmit one or more response messages (e.g., message 214) to a requesting mobile device comprising positioning assistance data that is tailored to the specific processing platform classification identified at block 404.

In the particular implementation illustrated in FIG. 4, a server (e.g., server 140, 150 or 155) may tailor positioning assistance data according to a processing platform classification of a requesting mobile device. Such a server may comprise a location server capable of handling general requests in support of location based services. Alternatively, such a server may comprise a server dedicated to providing assistance data upon request. In some implementations, a server may provide assistance data tailored according to a cost function. For example, data transmission capacity of a shared wireless communication link for providing positioning assistance data to a mobile device may be dynamic based, at least in part, on transmission range, presence of noise or presence of other devices contending or competing for available data transmission capacity, for example. As such, a cost function may apply a weight or cost to a predicted amount of data transmission capacity to be consumed by transmitting positioning assistance data in a response message. Here, in particular implementations, transmission of fully configured positioning assistance data to a requesting mobile device may consume more data transmission capacity on a wireless communication than transmission of raw data (e.g., map document in a raw format, and locations and identities of transmitters). Similarly, the cost function may apply a weight or cost to a processing load to be applied by processing resources of a computing platform to compute full positioning assistance data (e.g., including routeability map, digital map formatted for display and radio heatmap) from partial positioning assistance data (e.g., map document in raw format and locations/identities of transmitters). Accordingly, an attempt to minimize the cost function may tradeoff consumption of data transmission capacity for transmission of requested positioning assistance data with consumption of processing resources to compute fully configured positioning assistance data from the positioning assistance data received from a server.

In a particular implementation, to determine or derive parameters for weighting predicted data transmission capacity as part of a cost function, either a mobile device or server may obtain or maintain dynamic metrics indicative of available data transmission capacity for transmission of requested positioning assistance data. Other parameters for weighting consumption of processing resources to compute fully configured positioning assistance data may consider, for example, a particular processing platform classification of a mobile device available to compute the fully configured positioning assistance data, available battery resources to power the processing resources, just to name a couple of examples.

In particular implementations, a cost function to be applied in balancing the utility of a degree to which a client mobile device is to infer positioning assistance data (e.g., versus having fully determined positioning assistance data furnished by a server) may utilize any one of several metrics. One such metric may include or consider a cost to a network of transmitting data through links between the mobile device and a server. For example, some cloud services assess a fee based upon a quantity of data transmitted. Additional cost metrics may include a cost attributed to a client mobile device or user of the client mobile device (e.g., in terms of a direct monetary cost, for example due to data or transmission charges, or a cost to performance of the client mobile device).

Another metric that may be utilized in a cost function may include a cost model that determines how much a user subscriber is willing to pay for fully determined positioning assistance data. For example, a user subscriber may be established as a paying subscriber or a free user. Here, a paying subscriber may receive fully determined positioning assistance data while a free user may receive only partially determined positioning assistance data (leaving the mobile device of the free user to infer remaining portions of the positioning assistance data). In another embodiment, if a subscriber is to be billed a fee for receiving requested positioning assistance data, the subscriber's mobile device may pre-compute an estimated cost (to be billed to the subscriber) for receiving fully configured positioning assistance data (as compared with receiving partial positioning assistance data). The mobile device may then select a particular type of positioning assistance data that would incur a lowest estimated cost.

Another metric that may be utilized in a cost model may reflect available data transmission capacity in a network. For example, transmission of voluminous positioning assistance data may impact a subscriber's usage on a variable cost or tiered data plan. Here, a cost function may be more favorable to having subscriber's mobile device receive fully determined positioning assistance data if the subscriber is on a premium data plan while being more favorable to having the mobile device receive only partially determined positioning assistance data if the subscriber is on a lower tier data plan (leaving the mobile device under the lower tier plan to infer remaining portions of the positioning assistance data). In one particular implementation, a request from a subscriber's mobile device for assistance data exceeding the subscriber's plan may be denied. In one example, a user may have a mobile device configured to always request partially configured positioning data to save on data charges, but the cost function may be used to determine that an available battery (or other resource of the mobile device) may not support calculation of the fully configured positioning data or that a utility of preserving the battery (or other resource) outweighs the savings on the data charges. In this example, fully configured positioning data may be transmitted to the mobile device instead of the requested partially configured positioning data. In some embodiments, the cost model may utilize information related to a cost to the network over which information is transmitted, for example based on available data transmission capacity in the network.

In one implementation, a server may group particular mobile device processing capabilities with different groups of tiers. For example, one processing platform category with robust processing capabilities (e.g., from processor speed and memory capability) with a full battery may be grouped to a tier to receive minimal assistance data since the mobile device would be capable of inferring additional assistance data while still having sufficient battery resources to carry out other functions. On the other hand, a mobile device with minimal processing capabilities may be grouped to a tier to receive rich and detailed assistance data since the mobile device may not have sufficient processor and memory resources to infer assistance data. In another example, a mobile device with robust processing capabilities but with a depleted battery may also be grouped with the tier to receive rich and detailed assistance data since inferring assistance data may further strain battery resources. Thus, in some embodiments, varying levels of positioning data may be separated into a plurality of tiers, and a level or type of positioning data may be selected for provision to a mobile device based on a cost function and/or by matching a capability of the mobile device to the appropriate tier.

Another metric to be utilized in a cost model may reflect a battery level of a subscriber mobile device. Here, a cost function may favor sending fully determined positioning assistance data to a mobile device with a lower battery level (to conserve battery life for other functions) and favor sending only partially determined positioning assistance data to a mobile device with a higher battery level.

As pointed out above, some mobile devices may not have any capability to infer positioning assistance data. Accordingly, a server may provide fully derived positioning assistance data (rather than having the mobile device infer the positioning assistance data). As such, a cost model may set a very high cost to having such a mobile device infer positioning assistance data. It should be understood that the above mentioned metrics for use by a cost model in determining whether a mobile device is to receive fully determined or partially determined positioning assistance data are merely example metrics, and that a cost function may apply different metrics without deviating from claimed subject matter.

Furthermore, particular implementations of a cost function may apply any or a combination of metrics. In one example, if a processing platform of a mobile device is capable of fully inferring positioning assistance data, but the mobile device comprises a depleted battery, a cost function may indicate that fully configured positioning assistance data is to be provided to the mobile device. In another example, if a mobile device requests for additional positioning assistance data but providing such additional positioning assistance data would exceed a subscriber user's data plan, the request may be denied or only partially determined or inferred positioning assistance data may be provided in response to the request.

As pointed out above, a cost associated with a particular level of assistance data provided to a mobile device may be quantified according to a cost to subscriber. In one particular implementation, a particular monetary cost of a particular level of assistance data may be dynamic based on particular conditions (e.g., available network transmission capacity and current loading). Here, a mobile device may transmit an initial request for an estimate of a monetary cost to a subscriber of a particular level or levels of assistance data. This cost may be determined based, at least in part on a cost of transmitting a level of assistance data based on current network conditions. The determination of how much data a mobile device and/or the determination of how much data to transmit to the mobile device may be based on this determined cost.

As pointed out above, a mobile device may indicate its capability to infer positioning assistance data in a message requesting positioning assistance data. According to an embodiment, a service subscriber may pre-register its mobile device including indicating capabilities of the mobile device, preferences (e.g., including preferences for either fully configured positioning assistance data, partially configured positioning assistance data, etc.), parameters, a level of positioning assistance data to be provided, etc. Parameters provided by the service subscriber in the course of such a registration process may be stored in a memory at, or to be accessible by, a server that is to service requests from the mobile device for positioning assistance data. Here, a request from a mobile device for positioning assistance data may include a unique identifier of the mobile device. In response to such requests from the mobile device for positioning assistance device, the server may determine positioning assistance data to be provided to the requesting mobile by, for example, applying the stored parameters such as by using a cost function.

Varying a type of assistance data based on processing capabilities and other considerations allows flexibility in adapting to processing capabilities and network conditions. This may allow for improved utilization of processing resources and/or network capacity in providing assistance data for positioning operations.

Figure 5:
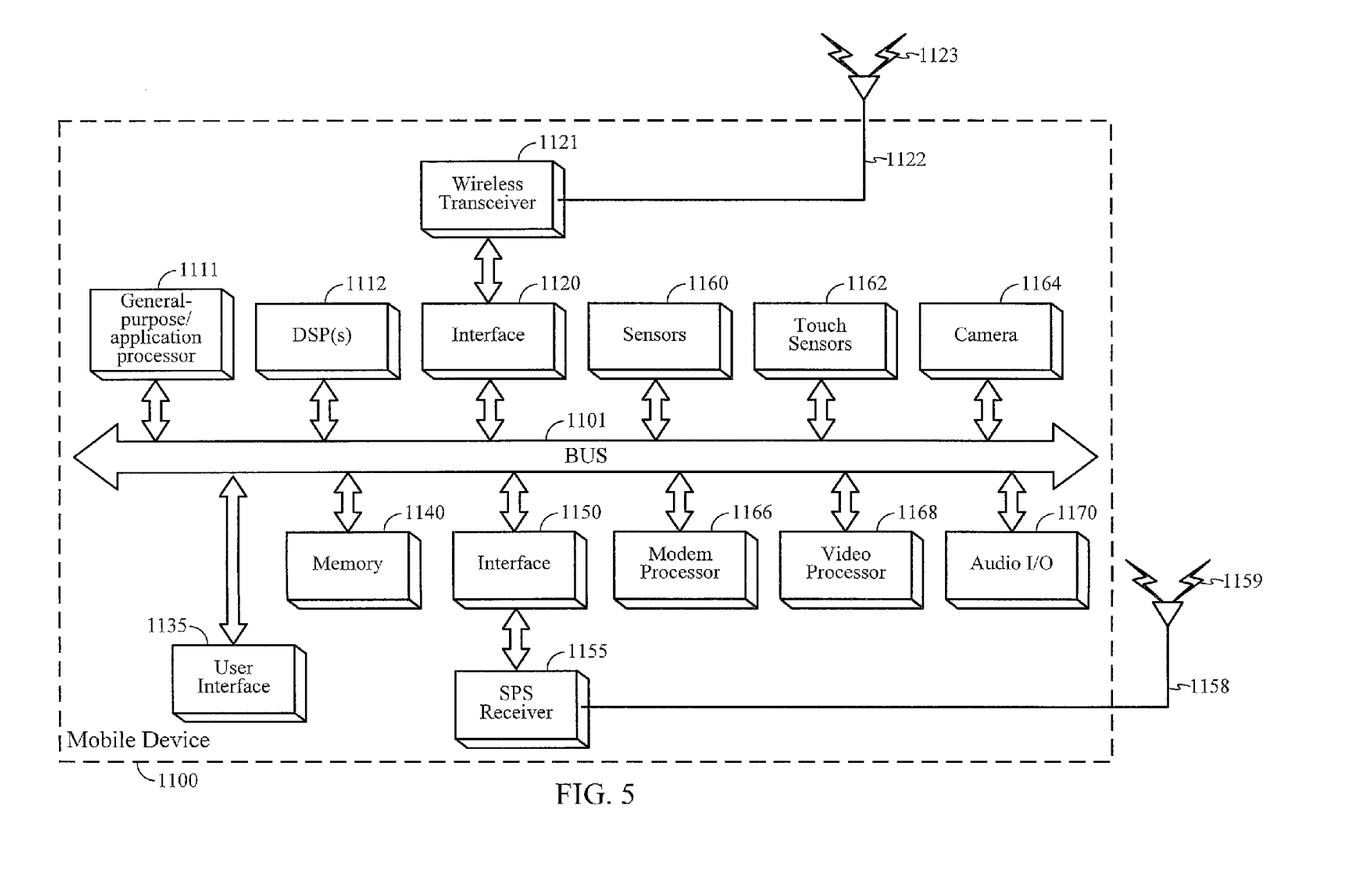
FIG. 5 is a schematic block diagram illustrating an exemplary mobile device, in accordance with an implementation.

FIG. 5 is a schematic diagram of a mobile device according to an embodiment. Mobile device 100 (FIG. 1) may comprise one or more features of mobile device 1100 shown in FIG. 5. In certain embodiments, mobile device 1100 may also comprise a wireless transceiver 1121 which is capable of transmitting and receiving wireless signals 1123 via an antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, WiFi, CDMA, WCDMA, LTE and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 5, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 5, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect. In addition, wireless transceiver 1121, modem processor 1166, general purpose/application processor 1111 and/or DSP(s) 1112 may provide means for transmitting one or more request messages to a server, and/or means for receiving response messages transmitted in response to the one or more request messages. Similarly, wireless transceiver 1121, modem processor 1166, general purpose/application processor 1111 and/or DSP(s) 1112 may be configured to perform actions at blocks 302 and 304 in FIG. 3 discussed above. It should be understood, that these are merely specific examples of structures disclosed herein which are capable of performing these functions, and claimed subject matter is not limited to these particular structures.

Figure 6:
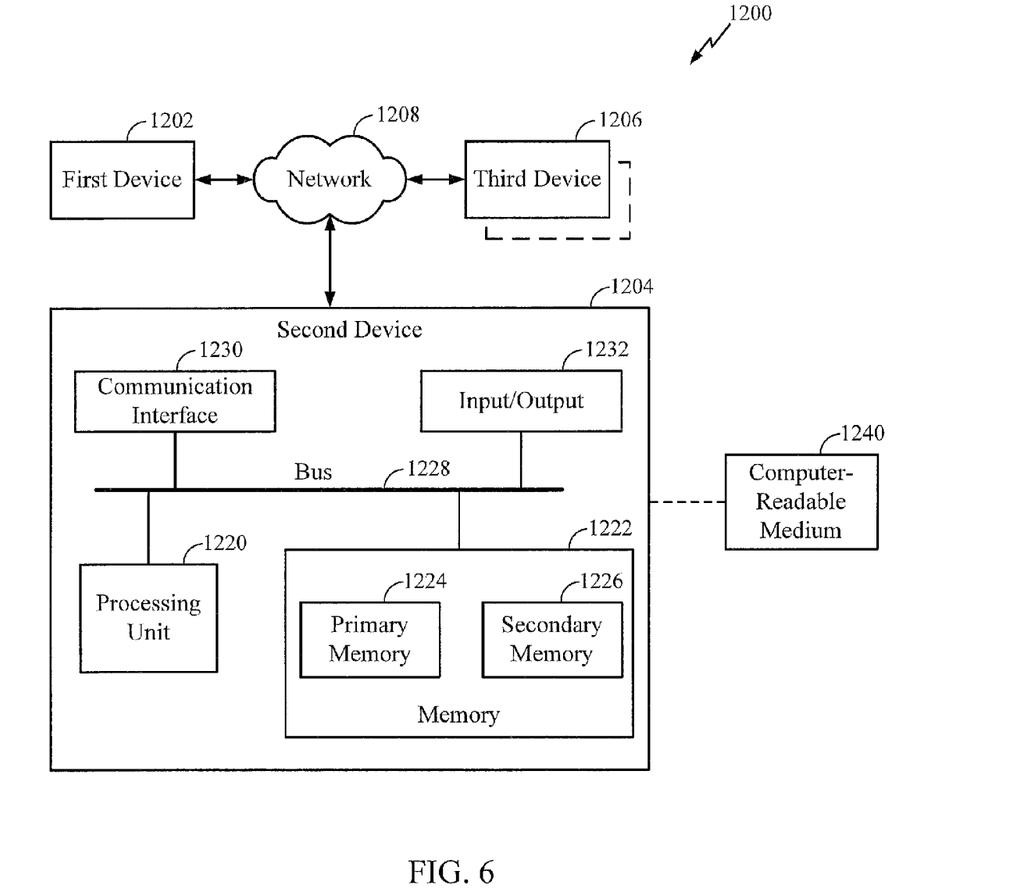
FIG. 6 is a schematic block diagram of an example computing platform according to an implementation.

FIG. 6 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. First device 1202 may also comprise a server capable of providing an LCI to a requesting mobile device based, at least in part, on a rough estimate of a location of the requesting mobile device. First device 1202 may also comprise a server capable of providing indoor positioning assistance data relevant to a location of an LCI specified in a request from a mobile device. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 6, may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. First, second and third devices may be examples of implementations of servers 140, 150 and 155. Any of the first, second, and third devices 1202, 1204, and 1206, respectively, may comprise one or more of a base station almanac server, a base station, or a mobile device in accordance with the examples described herein.

Similarly, wireless communications network 1208, as shown in FIG. 6, is representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium. In particular embodiments, processing unit 1220, bus 1228, memory 1222 and/or computer readable medium 1249 may provide means for identifying a capability of a mobile device based, at least in part, on a request message received from the mobile device. Similarly, processing unit 1220, bus 1228, memory 1222 and/or computer readable medium 1249 may be configured to perform actions of block 404 in FIG. 4

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like. In particular embodiments, communication interface 1030 may comprise one example of means for receiving one or more request messages requesting positioning assistance data and/or means for transmitting one or more response messages including positioning data. Similarly, communication interface 1030 may be configured to perform actions of blocks 402 and/or 406 in FIG. 4

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
transmitting one or more request messages for positioning parameters, the one or more request messages indicating whether the mobile device includes an enhanced processing platform capability, the indicated capability including an enhanced capability of one or more processors of the mobile device, an enhanced battery capability, an enhanced memory capability, or any combination thereof; and
in response to at least one of the one or more request messages, receiving one or more response messages comprising positioning parameters selected based, at least in part, on a tier of assistance parameters, from among a plurality of tiers of assistance parameters, matching the indicated capability, wherein a first tier of the plurality of tiers of assistance parameters corresponds to a first set of assistance parameters being provided to a mobile device comprising relatively robust processing resources, and wherein a second tier of the plurality of tiers corresponds to a second set of assistance parameters being provided to a mobile device comprising less-robust processing resources.

2. The method of claim 1, wherein the one or more request messages comprise a request for assistance parameters, and wherein the one or more response messages comprise assistance parameters.

3. The method of claim 1, wherein the received positioning parameters comprise a computed radio heatmap and routeability graph.

4. The method of claim 1, wherein the received positioning parameters comprise at least one of a line of sight (LOS)/non-line of sight (NLOS) indication, a probability heatmap, exclusion/accessor information, a per AP bounding box, or any combination thereof.

5. The method of claim 1, wherein the received positioning parameters comprise locations of transmitters and a map in a raw format indicating a building layout specifying walls.

6. The method of claim 5, wherein the raw format comprises at least one of a proprietary CAD format, Joint Photographic Experts Group (JPEG) format, Tagged Image File Format (TIFF), or Graphics Interchange Format (GIF).

7. The method of claim 5, and further comprising computing a routeabilty graph from the building layout.

8. The method of claim 5, and further comprising computing a radio heatmap from the building layout and locations of the transmitters.

9. The method of claim 8, wherein the radio heatmap comprises an association of expected signature values of acquired signals with discrete locations.

10. The method of claim 1, wherein the request message indicates a processing platform classification of the device, at least in part, by a unique device identifier, mobile device make, mobile device model, mobile device version, or any combination thereof.

11. The method of claim 1, further comprising:
transmitting a message requesting a cost value; and
receiving a response message indicating the cost value, the cost value being computed based, at least in part, on a cost of parameters transmission or a cost of utilizing a server perform certain processing functions, wherein the requested positioning parameters is based, at least in part, on the received cost value.

12. A mobile device comprising:
a transceiver to facilitate communication through a wireless network; and
one or more processors to:
initiate transmission of one or more request messages through the transceiver for positioning parameters, the request messages to indicate whether the mobile device includes an enhanced processing platform capability the indicated capability to include an enhanced capability of one or more processors of the mobile device, an enhanced battery capability, an enhanced memory capability, or any combination thereof; and
obtain positioning parameters in one or more response messages received at the transceiver in response to the one or more request messages, the positioning parameters selected based, at least in part, on a tier of assistance parameters, from among a plurality of tiers of assistance parameters, to match the indicated capability, wherein a first tier of the plurality of tiers of assistance parameters is to correspond to a first set of assistance parameters to be provided to a mobile device to comprise relatively robust processing resources, and wherein a second tier of the plurality of tiers is to correspond to a second set of assistance parameters to be provided to a mobile device to comprise less-robust processing resources.

13. The mobile device of claim 12, wherein the one or more request messages comprise a request for assistance parameters, and wherein the one or more response messages comprise assistance parameters.

14. The mobile device of claim 12, wherein the received positioning parameters comprise a computed radio heatmap and routeability graph.

15. The mobile device of claim 14, wherein the radio heatmap comprises an association of expected signature values of acquired signals with discrete locations.

16. The mobile device of claim 12, wherein the received positioning parameters comprise at least one of a line of sight (LOS)/non-line of sight (NLOS) indication, a probability heatmap, exclusion/accessor information, a per AP bounding box, or any combination thereof.

17. The mobile device of claim 12, wherein the obtained positioning parameters comprise locations of transmitters and a map in a raw format to indicate a building layout specifying walls.

18. The mobile device of claim 17, wherein the raw format comprises at least one of a proprietary CAD format, Joint Photographic Experts Group (JPEG) format, Tagged Image File Format (TIFF), Graphics Interchange Format (GIF), or any combination thereof.

19. The mobile device of claim 12, wherein the request message indicates a processing platform classification of the device, at least in part, by a unique device identifier, mobile device make, mobile device model, mobile device version, or any combination thereof.

20. The mobile device of claim 12, wherein the one or more processors are further configured to:
initiate transmission of a message through the transceiver to request a cost value; and
obtain a response message received at the transceiver to indicate the cost value, the cost value to be computed based, at least in part, on a cost of parameters transmission or a cost of to utilize a server to perform certain processing functions, wherein the requested positioning parameters are to be based, at least in part, on the received cost value.

21. A non-transitory storage medium comprising machine-readable instructions stored thereon which are executable by a special-purpose computing apparatus to:
  initiate transmission of one or more request messages for positioning parameters, the request messages to indicate whether the mobile device includes an enhanced processing platform capability, the indicated capability to include an enhanced capability of one or more processors of the mobile device, and enhanced battery capability, an enhanced memory capability, or any combination thereof; and
  obtain positioning parameters in one or more response messages received in response to the one or more request messages, the positioning parameters to be selected based, at least in part, on a tier of assistance parameters, from among a plurality of tiers of assistance parameters, to match the indicated capability, wherein a first tier of the plurality of tiers of assistance parameters is to correspond to a first set of assistance parameters to be provided to a mobile device to comprise relatively robust processing resources, and wherein a second tier of the plurality of tiers is to correspond to a second set of assistance parameters to be provided to a mobile device to comprise less-robust processing resources.

22. An apparatus, including a memory and a processor, comprising:
  means for transmitting one or more request messages for positioning parameters, the one or more request messages indicating whether the mobile device includes and enhanced processing platform capability, the indicated capability including an enhanced capability of one or more processors of the mobile device, an enhanced battery capability, an enhanced memory capability, or any combination thereof; and
  means for receiving one or more response messages transmitted in response to at least one of the one or more request messages comprising positioning parameters selected based, at least in part, on a tier of assistance parameters, from among a plurality of tiers of assistance parameters, matching the indicated capability, wherein a first tier of the plurality of tiers of assistance parameters corresponds to a first set of assistance parameters being provided to a mobile device comprising relatively robust processing resources, and wherein a second tier of the plurality of tiers corresponds to a second set of assistance parameters being provided to a mobile device comprising less-robust processing resources.

23. A method comprising, at a server:
  receiving one or more request messages from a mobile device requesting positioning parameters;
  identifying whether the mobile device includes and enhanced processing platform capability based, at least in part, on at least one of the request messages, the identified capability including an enhanced capability of one or more processors of the mobile device, an enhanced battery capability, an enhanced memory capability, or any combination thereof; and
  transmitting one or more response messages to the mobile device including positioning parameters selected based, at least in part, on a tier of assistance parameters being selected, from among a plurality of tiers of assistance parameters, matching the identified capability, wherein a first tier of the plurality of tiers of assistance parameters corresponds to a first set of assistance parameters being provided to a mobile device comprising relatively robust processing resources, and wherein a second tier of the plurality of tiers corresponds to a second set of assistance parameters being provided to a mobile device comprising less-robust processing resources.

24. The method of claim 23, wherein the identifying comprises classifying the mobile device as one of a plurality of processing platform classifications based, at least in part, on the at least one of the request messages, and wherein the positioning parameters are based, at least in part, on the processing platform classification.

25. The method of claim 23, wherein the one or more request messages comprise a request for assistance parameters, and wherein the one or more response messages comprise assistance parameters.

26. The method of claim 23, and further comprising:
  maintaining a plurality of levels of positioning assistance parameters having different degrees of configuration; and
  determining the positioning parameters for transmission at a level matching the identified capability.

27. The method of claim 23, and further comprising:
  formatting a digital map for presentation on a display of the mobile device based, at least in part, on the identified capability; and
  including the formatted digital map as the positioning parameters in the one or more response messages.

28. The method of claim 23, and further comprising selecting the tailored positioning assistance parameters based, at least in part, on application of a cost function.

29. The method of claim 28, wherein the cost function is based, at least in part, on a predicted usage of a transmission link to transmit the one or more response messages.

30. The method of claim 29, wherein the cost function is based, at least in part, on the identified enhanced processing platform capability.

31. The method of claim 29, wherein the predicted usage is indicative of a cost to transmit parameters over the transmission link based, at least in part, on a current loading or capacity of the transmission link, services to be accessed by the mobile device, or a data plan associated with the mobile device.

32. The method of claim 23, further comprising maintaining registration parameters for a plurality of mobile devices including the mobile device from which the one or more request messages are received, wherein the identifying comprises determining the capability based, at least in part, on the at least one of the request messages and the registration parameters.

33. A server comprising:
  a transceiver to facilitate communication over a network; and
  one or more processors to:
    obtain one or more request messages from a mobile device for positioning parameters received at the transceiver;
    identify whether the mobile device includes an enhanced processing platform capability based, at least in part, on at least one of the request messages, the identified capability including an enhanced capability of one or more processors of the mobile device, an enhanced battery capability, an enhanced memory capability, or any combination thereof; and
    initiate transmission of one or more response messages through the transceiver to the mobile device to include positioning parameters selected based, at least in part, on a tier of assistance parameters, from among a plurality of tiers of assistance parameters, to match the identified enhanced processing platform capability, wherein a first tier of the plurality of tiers of assistance parameters corresponds to a first set of assistance parameters to be provided to a mobile device to comprise relatively robust processing resources, and wherein a second tier of the plurality of tiers corresponds to a second set of assistance parameters to be provided to a mobile device to comprise less-robust processing resources.

34. The server of claim 33, wherein to identify comprises to classify the mobile device as one of a plurality of processing platform classifications based, at least in part, on the at least one of the request messages, and wherein the positioning parameters is based, at least in part, on the processing platform classification.

35. The server of claim 33, wherein the one or more request messages comprise a request for assistance parameters, and wherein the one or more response messages comprise assistance parameters.

36. The server of claim 33, wherein the one or more processors are further configured to:
    maintain a plurality of levels of positioning assistance parameters having different degrees of configuration; and
    determine the positioning parameters for transmission at a level matching the identified capability.

37. The server of claim 33, wherein the one or more processors are further configured to:
    format a digital map for presentation on a display of the mobile device based, at least in part, on the identified capability; and
    include the formatted digital map as the positioning parameters in the one or more response messages.

38. The server of claim 33, wherein the one or more processors are further configured to select the positioning parameters based, at least in part, on application of a cost function.

39. The server of claim 38, wherein the cost function is based, at least in part, on a predicted usage of a transmission link to transmit the one or more response messages.

40. The server of claim 39, wherein the cost function is based, at least in part, on the identified capability.

41. The server of claim 39, wherein the predicted usage is indicative of a cost to transmit parameters over the transmission link based, at least in part, on a current loading or capacity of the transmission link, services to be accessed by the mobile device, or a data plan associated with the mobile device.

42. The server of claim 33, wherein the one or more processors are further configured to maintain registration parameters for a plurality of mobile devices to include the mobile device from which the one or more request messages are received, wherein to identify comprises to determine the capability based, at least in part, on the at least one of the request messages and the registration parameters.

43. A non-transitory storage medium comprising machine-readable instructions stored thereon which are executable by a special purpose computing apparatus to:
    obtain one or more request messages from a mobile device to request positioning parameters, the one or more request messages from the mobile device to indicate whether the mobile device includes an enhanced processing platform capability, the indicated capability to include an enhanced capability of one or more processors of the mobile device, an enhanced battery capability, an enhanced memory capability, or any combination thereof;
    identify capability of the mobile device based, at least in part, on at least one of the request messages; and
    initiate transmission of one or more response messages to the mobile device to include positioning parameters selected based, at least in part, on a tier of assistance parameters, from among a plurality of tiers of assistance parameters, to match the identified capability, wherein a first tier of the plurality of tiers of assistance parameters to correspond to a first set of assistance parameters to be provided to a mobile device to comprise relatively robust processing resources, and wherein a second tier of the plurality of tiers to correspond to a second set of assistance parameters to be provided to a mobile device to comprise less-robust processing resources.

44. An apparatus, including a memory and a processor, comprising:
    means for receiving one or more request messages from a mobile device requesting positioning parameters, the one or more request messages indicating whether the mobile device includes an enhanced processing platform capability;
    means for identifying a capability of the mobile device based, at least in part, on at least one of the request messages, the identified capability to include an enhanced capability of one or more processors of the mobile device, an enhanced battery capability, an enhanced memory capability, or any combination thereof; and
    means for transmitting one or more response messages to the mobile device including positioning parameters selected based, at least in part, on a tier of assistance parameters, from among a plurality of tiers of assistance parameters, matching the identified capability, wherein a first tier of the plurality of tiers of assistance parameters to correspond to a first set of assistance parameters to be provided to a mobile device to comprise relatively robust processing resources, and wherein a second tier of the plurality of tiers to correspond to a second set of assistance parameters being provided to a mobile device to comprise less-robust processing resources.

* * * * *